(12) United States Patent
Kim

(10) Patent No.: US 11,933,244 B2
(45) Date of Patent: Mar. 19, 2024

(54) DUCTED FUEL INJECTION SYSTEMS AND METHODS IMPLEMENTING PILOT INJECTION

(71) Applicant: Caterpillar Inc., Peoria, IL (US)

(72) Inventor: Charlie Kim, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 21 days.

(21) Appl. No.: 17/463,572

(22) Filed: Sep. 1, 2021

(65) Prior Publication Data
US 2023/0061758 A1    Mar. 2, 2023

(51) Int. Cl.
*F02D 41/40*        (2006.01)
*F02D 41/38*        (2006.01)

(52) U.S. Cl.
CPC ......... *F02D 41/401* (2013.01); *F02D 41/403* (2013.01); *F02D 2041/389* (2013.01); *F02D 2200/023* (2013.01); *F02D 2200/024* (2013.01); *F02D 2200/0602* (2013.01)

(58) Field of Classification Search
CPC .. F02M 61/18; F02M 61/1813; F02M 61/182; F02B 23/06; F02B 23/0645; F02B 23/0648; F02B 23/0651; F02D 41/40; F02D 41/401; F02D 41/403; F02D 2041/389; F02D 2200/023; F02D 2200/024; F02D 2200/0602
See application file for complete search history.

(56) References Cited

U.S. PATENT DOCUMENTS

| 10,151,235 | B2 | 12/2018 | Anders et al. |
| 10,711,752 | B2 | 7/2020 | Martin et al. |
| 2012/0000197 | A1* | 1/2012 | Maruyama ............ F02D 41/405 60/605.2 |
| 2012/0197512 | A1* | 8/2012 | Yamada ................ F02D 41/403 701/105 |
| 2015/0354519 | A1* | 12/2015 | Shimo ................ F02B 23/0645 123/445 |
| 2016/0326970 | A1* | 11/2016 | Fei ....................... F02D 19/0694 |
| 2017/0241368 | A1* | 8/2017 | Anders ............... F02B 23/0669 |
| 2018/0258836 | A1* | 9/2018 | Anders .................... F02B 23/00 |
| 2018/0320616 | A1* | 11/2018 | Hoshi ..................... F02D 45/00 |
| 2020/0386175 | A1* | 12/2020 | Fiveland ............ F02D 41/1462 |

* cited by examiner

*Primary Examiner* — John Kwon
*Assistant Examiner* — Johnny H Hoang
(74) *Attorney, Agent, or Firm* — Xsensus, LLP

(57) ABSTRACT

Systems and methods regarding a ducted fuel injection (DFI) combustion system for an internal combustion engine can control an injection timing of a fuel injector to output fuel injections through at least one duct and into a combustion chamber of the internal combustion engine. The injection timing can include one or more pilot injections according to a predetermined range before top dead center (BTDC) for a combustion cycle; and a main injection into the combustion chamber for the combustion cycle after all of the one or more pilot injections. A first amount of the fuel injected for the main injection can be greater than a second amount of fuel injected for the one or more pilot injections. The predetermined range before top dead center (BTDC) of the one or more pilot injections can be from 85 to 40 degrees BTDC.

7 Claims, 6 Drawing Sheets

DUCTED FUEL INJECTION SYSTEMS AND METHODS IMPLEMENTING PILOT INJECTION

TECHNICAL FIELD

The present disclosure generally relates to fuel injection systems and methods. More particularly, the present disclosure relates to use of one or more pilot injections in ducted fuel injection (DFI) systems and methodologies.

BACKGROUND

Combustion engines may include one or more cylinders as part of the engine. The cylinder head and an associated piston may define a combustion chamber therebetween. Fuel for combustion can be directly injected into the combustion chamber by, for example, a fuel injector associated with the cylinder, where the fuel injector may have at least one orifice disposed such that the fuel injector can directly inject fuel into the combustion chamber.

Different mixtures and/or equivalence ratios of the fuel/air mixture may produce different results during combustion. A manner in which the injected fuel mixes and/or interacts with air and other environmental elements of the combustion chamber may impact the combustion process and associated emissions. Further, if the fuel and air mixing is inadequate, a larger amount of soot may form within the combustion chamber.

Ducted assemblies may be implemented in combustion engines to enhance mixing and reduce the amount of soot formed within the combustion chamber. The ducted assemblies may include one or more tubular structures known as ducts coupled to the cylinder head. The ducts can be positioned relative to the fuel injector such that the ducts receive fuel jets from the at least one orifice of the fuel injector. The fuel jets interact with the ducts to enhance mixing, thereby reducing the amount of soot formed.

For instance, U.S. Pat. No. 10,151,235 ("the '235 patent") describes a ducted combustion system for an internal combustion engine. According to the '235 patent, multiple ducts are disposed within the combustion chamber between a flame deck surface and a piston crown, where the ducts are disposed such that each of a plurality of fuel jets at least partially enters one of the ducts.

On the other hand, non-ducted internal combustion engines may use pilot injection to minimize noise as well as create a low temperature reaction from the early pilot to try to minimize soot formation in the main injection. For the pilot injection this may result in a relatively low temperature combustion because the pilot injection is occurring relatively early in the combustion cycle and the temperature is relatively low. This means that air and fuel are mixing at the relatively low temperature can cause a relatively cool flame/medium temperature combustion. However, since the pilot injection is occurring relatively early in the combustion cycle, the cylinder density can be relatively low, which can lead to overpenetration of the fuel for the pilot injection. Overpenetration can lead to the fuel reaching the cylinder walls (which may be relatively cool), i.e., wall wetting, which, in turn, can lead to incomplete reaction and, consequently, relatively high carbon monoxide (CO) and hydrocarbon emissions.

Other features and aspects of this disclosure will be apparent from the following description and the accompanying drawings.

SUMMARY

In an aspect of the present disclosure, systems and methods regarding a ducted fuel injection (DFI) combustion system for an internal combustion engine can control an injection timing of a fuel injector to output fuel injections through at least one duct and into a combustion chamber of the internal combustion engine. The injection timing can include one or more pilot injections according to a predetermined range before top dead center (BTDC) for a combustion cycle; and a main injection into the combustion chamber for the combustion cycle after all of the one or more pilot injections. A first amount of the fuel injected for the main injection can be greater than a second amount of fuel injected for the one or more pilot injections. The predetermined range before top dead center (BTDC) of the one or more pilot injections can be from 85 to 40 degrees BTDC.

In another aspect of the present disclosure, a non-transitory computer-readable storage medium having stored thereon instructions can be provided or disclosed. The instructions, when executed by one or more processors, can cause the one or more processors to perform a method. The method can comprise: controlling a fuel injector to inject one or more distinct pilot injections into a combustion chamber of an internal combustion engine through at least one duct in a predetermined range before top dead center (BTDC) for a combustion cycle; and controlling the fuel injector to inject a main injection into the combustion chamber through the at least one duct for the combustion cycle. A first amount of the fuel injected for the main injection can be greater than a second amount of fuel injected for said controlling the fuel injector to inject the one or more distinct pilot injections. The predetermined range before top dead center (BTDC) of the one or more distinct pilot injections can be from 85 to 40 degrees BTDC.

In yet another aspect, a method can be disclosed or implemented. The method can comprise: outputting, under control of control circuitry, to a combustion chamber of an internal combustion engine via a fuel injection system and at least one duct, at least one pilot injection of fuel in a predetermined range before top dead center (BTDC) for a combustion cycle of the internal combustion engine; and outputting, under control of the control circuitry, to the combustion chamber via the fuel injection system and the at least one duct, a main injection of fuel for the combustion cycle of the internal combustion engine after said outputting the at least one pilot injection. The main injection of fuel can pass through the at least one duct to and the at least one pilot injection of fuel passes through the at least one duct. An amount of the at least one pilot injection can be less than an amount of the main injection. The predetermined range before top dead center (BTDC) of the at least one pilot injection of fuel can be from 85 to 40 degrees BTDC.

And in another aspect, a ducted fuel injection (DFI) combustion system for a diesel internal combustion engine can be provided or disclosed. The ducted fuel injection (DFI) combustion system can comprise: a combustion chamber defined between a flame deck surface of a cylinder head of the diesel internal combustion engine and a piston crown of a piston disposed within a cylinder bore of the diesel internal combustion engine; a fuel injector configured to inject fuel into the combustion chamber as at least one fuel jet; at least one duct disposed within the combustion chamber between the flame deck surface and the piston crown such that at least part of each said at least one fuel jet is respectively provided through the at least one duct; and a controller operatively coupled to control the fuel injector. The controller can be and configured to determine a condition of the diesel internal combustion engine where in-cylinder temperature of the combustion chamber is at or above a predetermined temperature threshold, the predetermined temperature threshold being a non-zero and non-startup temperature value, and in a case where the in-cylinder temperature of the combustion chamber is at or above the predetermined temperature threshold, control an injection timing of the fuel injector for each of a plurality of combustion cycles of the diesel internal combustion engine, the injection timing including one or more pilot injections in a predetermined range before top dead center (BTDC) and a main injection occurring after all of the one or more pilot injections. Fueling for the main injection can be greater than total fueling for all of the one or more pilot injections. The predetermined range before top dead center (BTDC) of the one or more pilot injections can be from 85 to 40 degrees BTDC.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Generally, embodiments of the disclosed subject matter relate to fuel injection systems and methods. In particular, embodiments of the present disclosure can implement one or more pilot injections at a specific timing in ducted fuel injection (DFI) systems and fuel injection methodologies.

Figure 1:
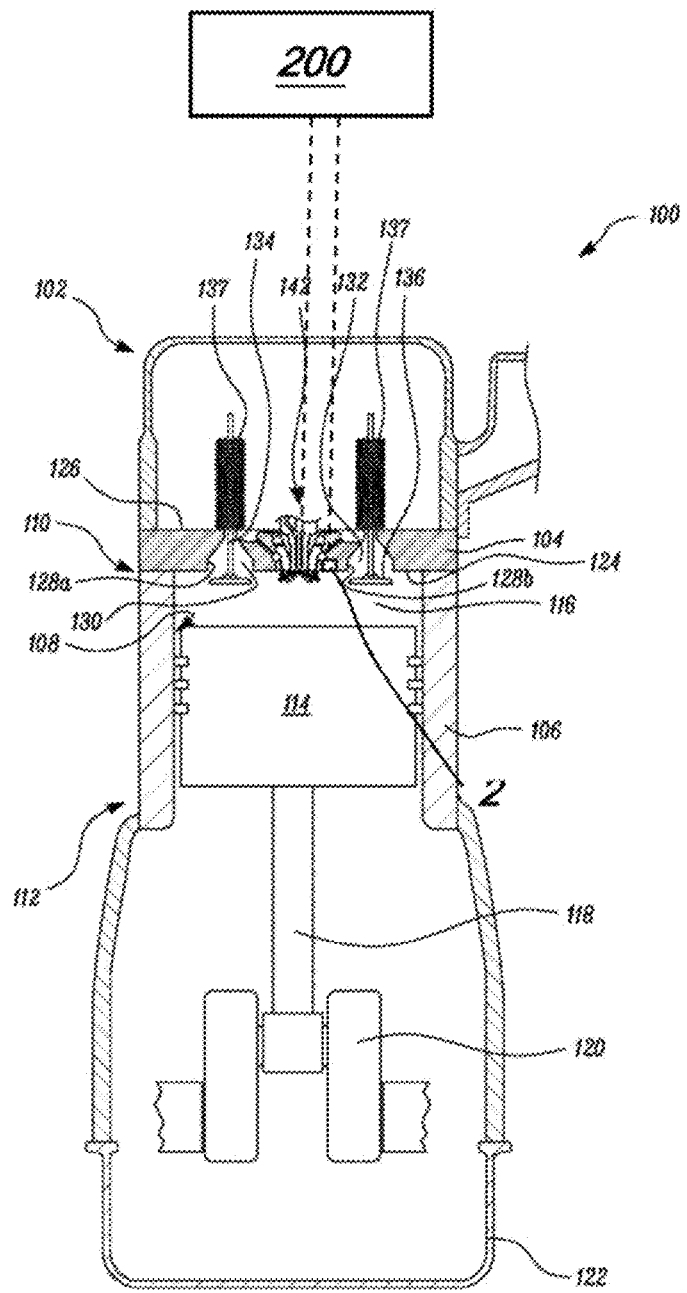
FIG. 1 is a sectional view of a portion of an exemplary engine according to one or more embodiments of the present disclosure.

Turning to the figures, FIG. 1 illustrates an exemplary engine 100. The engine 100 may be any engine running on solid, liquid, or gaseous fuel, used for various purposes such as, but not limited to, production of power for a marine vessel, an automobile, a construction machine, heavy machinery, any transportation vehicle, and the like. For example, the engine 100 may be an internal combustion engine running on a hydrocarbon fuel. According to one or more embodiments, the engine 100 can be a diesel internal combustion engine, though embodiments of the disclosed subject matter are not limited to diesel internal combustion engines.

The engine 100 may include an outer cover 102. The outer cover 102 can shroud the engine 100 and various engine components of the engine 100. The engine 100 can further include a cylinder head 104 and a cylinder block 106. The cylinder block 106 can define a piston bore 108 extending from a first end 110 of the cylinder block 106 to a second end 112 of the cylinder block 106. The piston bore 108 may be referred to or characterized as a cylinder bore. The piston bore 108 may be configured to receive a piston 114. The cylinder head 104, the piston bore 108 in the cylinder block 106, and the piston 114 can define a combustion chamber 116. The combustion chamber 116 may be defined or characterized as a variable volume enclosure defined by the cylinder head 104, the piston bore 108 in the cylinder block 106, and the piston 114, particularly a piston crown thereof.

The combustion chamber 116 can receive an intake charge, i.e., one or more of air, fuel, EGR, etc. In this regard, during engine operation the piston 114 can reciprocate within the piston bore 108 between a top dead center (TDC) (the uppermost position in the piston bore 108 of piston 114) position and a bottom dead center (BDC) (the lowermost position of piston 114) position. The piston 114 can be pivotably coupled to connecting rod 118. The piston 114 can slide or reciprocate within the piston bore 108 between the top dead center (TDC) position and the bottom dead center (BDC) position. This reciprocating movement of the piston 114 can cause a crankshaft 120, assembled within a crankcase 122, to rotate and produce mechanical work. Piston reciprocation from bottom dead center (BDC) to bottom dead center (BDC) with injection methodologies according to embodiments of the disclosed subject matter may be referred to or characterized herein as a combustion cycle, as pilot injection(s) can occur as the piston 114 is moving toward top dead center (TDC) and ignition and subsequent combustion can occur closer to TDC.

The piston 114 may include a piston head that may receive and/or may be exposed to combustion gases (i.e., the gases generated from burning of charge) generated within the combustion chamber 116. The combustion gases may move the piston 114 and transmit a driving force generated by the combustion event to the crankshaft 120. In the embodiment illustrated in FIG. 1 only one piston bore 108 and one piston 114 have been illustrated. Accordingly, only one combustion chamber 116 is illustrated in FIG. 1. However, it may be contemplated that in various other embodiments, the cylinder block 106 may include a plurality of piston bores, the same as or similar to the piston bore 108, and each such piston bore 108 may be configured to receive a piston similar to or the same as the piston 114. In such a configuration, the cylinder head 104, the plurality of piston bores (including the piston bore 108), and the plurality of pistons (including the piston 114) may respectively define a plurality of combustion chambers, the same as or similar to the combustion chamber 116.

The cylinder head 104 may include a first end surface 124 and a second end surface 126. The first end surface 124 of the cylinder head 104 may be referred to or characterized as a flame deck surface. As noted above, the cylinder head 104, the piston bore 108 in the cylinder block 106, and the piston 114 can define a combustion chamber 116. More specifically, the first end surface 124 of the cylinder head 104, the piston bore 108, and the piston 114, particularly the piston crown, can define the combustion chamber 116.

The second end surface 126 of the cylinder head 104 may define one or more valve openings 128a, 128b to respectively receive and facilitate operation of a valve. The valve openings 128a, 128b may be in fluid communication with an intake port 130 and an exhaust port 132, respectively, formed in the cylinder head 104 of the engine 100. Particularly, an intake valve 134 and an exhaust valve 136 may be operably disposed at least partially and respectively in the valve openings 128a, 128b. The intake valve 134 and/or the exhaust valve 136 may have a spring or an elastic element 137. The spring element 137 may be configured to bias the associated intake valve 134/exhaust valve 136 to a closed position. In various other embodiments, the spring element 137 may be any other type of biasing mechanism that can be used to bias the intake valve 134/exhaust valve 136 to their closed positions.

Figure 2:
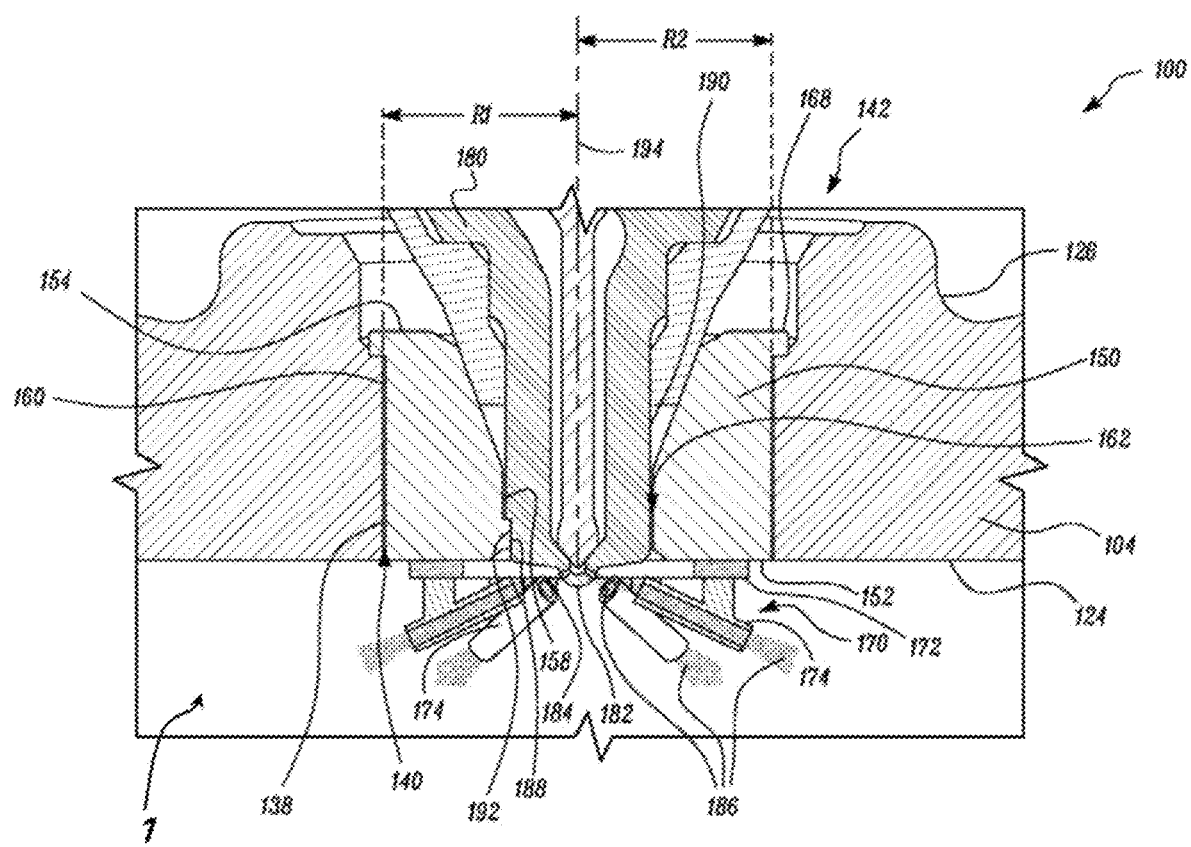
FIG. 2 is an enlarged sectional view of a portion of the engine of FIG. 1.

Referring to FIG. 2, the cylinder head 104 can include an inner cylinder surface 138 that defines a through-hole 140 extending from the first end surface 124 to the second end surface 126 of the cylinder head 104. The through-hole 140 can receive one or more engine components, as will be understood from the description below.

Referring now to FIG. 1 and FIG. 2, the engine 100 can include a fuel injector assembly 142. The fuel injector assembly 142 can be received within the through-hole 140 in the cylinder head 104. The fuel injector assembly 142 can include an insert 150, a duct structure 170, and a fuel injector 180. Thus, the engine 100, or portions thereof, such as at least the combustion chamber 116, the fuel injector 180, and the duct structure 170, can be referred to or characterized as a ducted fuel injection (DFI) combustion system. The fuel injector assembly 142 or components thereof, such as the fuel injector 180 (and optionally its corresponding components, such as railing, fuel reservoir, etc.), may be referred to or characterized as a fuel injection system. Optionally, the duct structure 170 may be considered part of the fuel injection system.

The insert 150 can be received within the through-hole 140 and can be coupled to the cylinder head 104 of the engine 100. The insert 150 can include a first end 152 and a second end 154. The insert 150 can further include an inner surface 158 and an outer surface 160. As an example, the insert 150 can be a metal or metallic structure (having a cavity) that has a shape based on that of the through-hole 140. For example, the through-hole 140 is illustrated as a hollow cylindrical cavity and the insert 150 is illustrated as an elongated member having a cylindrical cross-section.

In an embodiment, as illustrated in FIG. 2, for instance, the insert 150 may be coupled to the cylinder head 104 by press fitting the insert 150 into the through-hole 140 of the cylinder head 104. In such a configuration, the insert 150 may be sized such that a cross-section of the insert 150 is larger than a cross-section of the through-hole 140 present in the cylinder head 104. For example, the through-hole 140 defined by the cylinder head 104 may include a radius 'R1' (e.g., the radius 'R1' being constant from the first end surface 124 to the second end surface 126). The insert 150, at an outer periphery of the insert 150, may have a radius 'R2' (e.g., 'R2' being greater than 'R1'). As an example, radius R2 may be constant throughout a length (i.e., a length of the insert 150 extending between the first end 152 and the second end 154) of the insert 150. Of course, the insert 150 shown in FIG. 2 is merely one example according to embodiments of the disclosed subject matter.

In an embodiment, the second end 154 of the insert 150 may include a flanged region 168, such as shown in FIG. 2. The flanged region 168 may be defined as a portion of the insert 150 at the second end 154 having a cross-section larger than the cross-section of the through-hole 140. The flanged region 168 can abut the cylinder head 104 and may prevent or minimize axial movement of the insert 150 in a direction towards the combustion chamber 116.

Assembly of the fuel injector assembly 142 can be such that the insert 150 is placed in the through-hole 140 of the cylinder head 104 along a vertically downward direction (i.e., vertically downward along an axis 194 or in a direction from the second end surface 126 to the first end surface 124). However, in alternate embodiments, the insert 150 may be received and press-fitted within the through-hole 140 of the cylinder head 104 from below the cylinder head 104, i.e., in a vertically upward direction along the axis 194 or in a direction from the first end surface 124 or the piston adjacent surface of the cylinder head 104 towards the second end surface 126.

The insert 150 can be press fitted into the cylinder head 104 to couple the insert 150 with the cylinder head 104. However, in various other embodiments alternate ways may be used to couple the insert 150 with the cylinder head 104. For example, the insert 150 may be threadably coupled to the cylinder head 104. In this example, the insert 150 may have an insert thread provided on the outer surface 160 of the insert 150. The inner cylinder surface 138 may also include threads, which may be referred to as hole thread. The hole thread can have a profile that is complementary to the insert thread. In such a configuration, the insert thread may be engaged with the hole thread to rotatably couple the insert 150 with the cylinder head 104. In this example, the second end 154 of the insert 150 may also include the flanged region 168. Similar to above, the flanged region 168 may abut the cylinder head 104 when the insert 150 is received and threadably coupled with the cylinder head 104, thereby, preventing or minimizing axial movement of the insert 150 in the direction towards the combustion chamber 116 (as shown in FIG. 1).

Referring still to FIG. 2, the fuel injector assembly 142 can have the duct structure 170, which can be coupled to the first end 152 of the insert 150 such that a portion of the duct structure 170 extends into the combustion chamber 116 of the engine 100 (as illustrated in FIG. 1 and FIG. 2). The duct structure 170 may be coupled to the first end 152 of the insert 150 before the insert 150 is received within the through-hole 140. Alternatively, the duct structure 170 may be coupled to the first end 152 of the insert 150 after the insert 150 has been received and coupled with the cylinder head 104. Thus, in some embodiments all of the duct structure 170 may be provided in the combustion chamber 116, whereas in some embodiments only some of the duct structure 170 may be provided in the combustion chamber 116. Optionally, the duct structure 170 can be coupled (e.g., mounted) directly to the first end surface 124 of the cylinder head 104. As yet another example, some of the duct structure 170 can be coupled to the first end 152 of the insert 150 and some of the duct structure 170 can be coupled to the first end surface 124 of the cylinder head 104.

The duct structure 170 can include a base structure 172, and, according to one or more embodiments, a plurality of ducts 174, for instance, as illustrated in FIG. 2. The base structure 172 may be a solid structure coupled to the first end 152 of the insert 150. For example, the base structure 172 may be in the form of a ring around the fuel injector 180. It is noted, however, that embodiments of the disclosed subject matter are not limited to plural ducts 174. Rather, embodiments of the disclosed subject matter can include duct structures 170 with only one duct 174. Thus, duct structures 170 according to embodiments of the disclosed subject matter can be characterized as having at least one or one or more ducts 174.

The plurality of ducts 174 may extend from the base structure 172. The ducts 174 may be coupled to the base structure 172 via the use of one or more fasteners, such as bolts. In various other embodiments, the plurality of ducts 174 may be coupled to the base structure 172 via brazing, welding, or other means. In an embodiment, the base structure 172 and the plurality of ducts 174 may be an integrated or formed-in-one-piece structure (requiring no coupling with each other), for instance, fabricated via 3D-printing, additive manufacturing, casting, molding, etc.

Each duct 174 of the plurality of ducts 174 may be a tubular structure. In this regard, each duct 174 of the plurality of ducts 174 may include an inner duct wall and an outer duct wall, such as shown in the sectional view of FIG. 2. In an embodiment, the tubular structure of each duct 174 may correspond to a hollow cylindrical structure. In an alternate embodiment, the tubular structure of each duct 174 may be a hollow frusto-conical structure. In various other embodiments, the tubular structure of each duct 174 may correspond to a hollow elongated structure having a polygonal cross section.

Still referring to FIG. 1 and FIG. 2, the inner surface 158 of the insert 150 can define a bore 162 extending from the first end 152 of the insert 150 to the second end 154 of the insert 150. The bore 162 can receive the fuel injector 180. An outer surface 190 of the fuel injector 180 can be adjacent to a portion of the inner surface 158 of the insert 150, such as shown in FIG. 2. The fuel injector 180 can be configured to supply one or more fuel charges (e.g., fuel jets) into the combustion chamber 116.

The fuel injector 180 can include a tip 182. The tip 182 may extend into the combustion chamber 116 and may be in fluid communication with the combustion chamber 116. The tip 182 can include one or more orifices 184 to inject respective one or more fuel charges 186 into the combustion chamber 116. Hence, supplying one or more fuel charges into the combustion chamber 116 by the fuel injector 180 may be referred to or characterized as fuel injections (into the combustion chamber 116). According to one or more embodiments, the fuel output from the fuel injector 180 may be output in association with a pressure from 100 MPa to 300 MPa (inclusive). Thus, according to embodiments of the disclosed subject matter, the fuel may be output at a pressure not less than 100 MPa. Such pressure at which the fuel is supplied and/or output from the fuel injector 180 may be referred to as rail pressure.

The fuel injector 180 can be received within the bore 162 and can be coupled to the insert 150 such that the duct(s) 174 respectively align with orifice(s) 184 of the fuel injector 180. Optionally, an input of each duct 174 may be in close proximity but spaced from the output of the respective orifice 184, such as shown in FIG. 2. Such spacing may be referred to or characterized as standoff distance. According to one or more embodiments, the duct(s) 174 may be connected/coupled to the base structure 172 such that each duct 174 is inclined (at a specified angle) relative to the longitudinal axis 194 of the fuel injector 180/insert 150 (via use of one or more indexing structures provided on the duct(s) 174 and/or the base structure 172). For instance, each of the duct(s) 174 can be at a same spray or injection angle of the fuel exiting the respective orifice(s) 184, i.e., the same angle at which the injection or fuel charge 186 is output from the orifice(s) 184. Each duct 174 may also be oriented from input to output in a radially outward direction relative to a center longitudinal axis of the fuel injector 180.

The alignment of the duct(s) 174 relative to the fuel injector 180 can be such that at least some of each fuel charge(s) 186 can be respectively received by the duct(s) 174 from respective ones of the orifice(s) 184 of the fuel injector 180. Thus, some or all of each of the one or more fuel charges 186 can be provided from the fuel injector 180 to the combustion chamber 116 via the ducts 174. In some cases, part of the one or more fuel charges 186 may not be provided through the duct(s) 174.

The orifice(s) 184 (e.g., present on the tip 182 of the fuel injector 180) may be configured to directly inject a sequence of fuel charges 186 into the combustion chamber 116 via the duct(s) 174 during a combustion cycle. Generally, the combustion cycle may be defined or characterized as a cycle wherein fuel is introduced into the combustion chamber 116 to prepare an intake charge (i.e., create a suitable air-fuel mixture). As noted above, one combustion cycle may be based on or otherwise defined relative to reciprocation of the piston 114, particularly from bottom dead center (BDC) to bottom dead center (BDC). The combustion cycle may be any combustion cycle such as combustion cycles in 2-stroke, 4-stroke, dual fuel, etc. engines.

In one or more embodiments, the fuel injector 180 may be axially and rotationally aligned relative to the duct structure 170, such as shown in FIG. 2. In such a configuration, the insert 150 may have a protuberance 188 provided on the inner surface 158. The protuberance 188 may be a projection having any shape.

Optionally, a controller 200, which can represent one or more controllers, can be provided. Generally, the controller 200 can be operatively coupled to control various components of the engine 100 or systems thereof, such as the fuel injector assembly 142. Hence, the controller 200 can control fuel injection timing operations of the fuel injector assembly 142 (including multiple fuel injector assemblies 142). According to one or more embodiments, depending upon the particular type of machine in which the engine 100 is implemented, the controller 200 may be referred to or characterized as an electronic control unit or module (ECU/ECM).

The controller 200, which can be implemented in circuitry entirely or partially, can include one or more electronic processors, a non-transitory computer-readable media, and one or more input/output interfaces. The electronic processor(s), the computer-readable media, and the input/output interface(s) can be connected by one or more control and/or data buses that allow the components to communicate. It should be understood that the functionality of the controller 200 can be combined with one or more other controllers to perform additional functionality. Additionally or alternatively, the functionality of the controller 200 can be distributed among more than one controller. The computer-reasonable media, which, as noted above, can be non-transitory computer-readable storage media, can have instructions stored therein that, when executed by the controller 200, can cause the controller 200 to perform one or more methods, or portions thereof, according to embodiments of the disclosed subject matter.

According to one or more embodiments, at least one sensor 250 can be provided. The sensor (s) 250 can be provided in or on the engine 100, for instance, in correspondence with some or all of the cylinders of the engine 100. According to one or more embodiments the sensor 250 can sense pressure of the cylinder. Thus, the sensor 250 may be referred to or characterized as a pressure sensor. Additionally, in the case where the sensor 250 is provided in the cylinder, such as shown in FIG. 1, the sensor 250 may be referred to or characterized as an in-cylinder pressure sensor.

Pressure signals from the sensor 250 can be provided to the controller 200 and processed. According to one or more embodiments, the controller 200 can process the pressure signals to determine an in-cylinder temperature of the combustion chamber 116. Alternatively, the sensor 250 may be a temperature sensor to directly sense the temperature of the combustion chamber 116.

The controller 200 may use the feedback from the sensor(s) 250 to control the injection timing of the fuel injector assembly 142. For instance, feedback from the sensor(s) 250 can be used by the controller 200 to tailor when fuel injections occur in the combustion cycle in order to achieve a certain temperature or reaction in the combustion chamber 116. As an example, the fuel injections (pilot(s) and main) according to embodiments of the disclosed subject matter can be to achieve an air-fuel (A/F) mixture at a particular temperature or temperature range in the combustion chamber 116, such as 500 K to 750 K (inclusive). This temperature range may characterize the reactions as low/medium temperature reactions.

The controller 200 can control injection timing of the fuel injector 180 for each of a plurality of combustion cycles of the engine 100 according to a predetermined timing pattern according to embodiments of the disclosed subject matter. The timing pattern, according to one or more embodiments of the disclosed subject matter, can be performed only when operation of the engine 100, for instance, in-cylinder temperature, is within a predetermined temperature range. Predetermined temperature range can include or mean temperature of the engine 100 (e.g., in-cylinder temperature) reaching, i.e., being at or above, a predetermined temperature threshold. Put another way, the injection timing pattern according to embodiments of the disclosed subject matter may not be performed when in-cylinder temperature of the combustion chamber 116 is below a predetermined temperature range. For instance, the injection timing pattern according to embodiments of the disclosed subject matter may not be performed at start-up or during a start-up routine (i.e., with the engine 100 at within a start-up temperature value) of the engine 100.

As noted above, the sensor 250 can provided feedback to the controller 200 regarding such temperature of the engine 100. As an example, at least in terms of a minimum temperature threshold values or range for fuel injection, the predetermined temperature threshold for in-cylinder temperature of the combustion chamber 116 can be 500 K or 600 K, whereas the predetermined temperature range for the in-cylinder temperature of the combustion chamber 116 can be from 500 K to 600 K (inclusive).

In any event, the injection timing pattern according to embodiments of the disclosed subject matter can include, per combustion cycle, at least one/one or more first injections and a second injection. Each first injection may be referred to or characterized as a pilot injection and the second injection may be referred to or characterized as a main injection. As noted above, each injection may be passed through the duct(s) 174. According to embodiments of the disclosed subject matter, a second amount of fuel injected for the main injection of fuel can be greater than a first amount of the fuel injected for the pilot injection(s). Here, this can mean the total amount of fuel for all of the pilot injections can be less than the amount of fuel injected for the main injection.

The at least one/one or more pilot injections can include only one pilot injection per combustion cycle. Alternatively, the at least one/one or more pilot injections can include a plurality of pilot injections per combustion cycle. As an example, the number of pilot injections per combustion cycle can be two to six (inclusive). According to embodiments of the disclosed subject matter, only one main injection may occur per combustion cycle.

Each pilot injection, as well as the main injection, can be controlled, by the controller 200, to occur according to specific timings along the combustion cycle. In particular, all pilot injections can be controlled to occur in a predetermined range before top dead center (BTDC) for the combustion cycle. The main injection can be controlled to occur relative to top dead center (TDC) of the combustion cycle after completion of the pilot injection(s). For instance, the main injection timing can range from at or about 20 degrees BTDC to at or about 10 degrees after top dead center (ATDC). Thus, the main injection can at least start before TDC (e.g., at or about at 20 degrees BTDC), can start after TDC (e.g., at or about at 10 degrees ATDC), or can span TDC. According to one or more embodiments, the main injection may occur at least at TDC. The main injection, therefore, can start before TDC and end after TDC, according to one or more embodiments of the disclosed subject matter. Thus, the main injection, which can be continuous, can span TDC, meaning that the main injection can start before TDC and end after TDC or can start at TDC and end after TDC. According to one or more embodiments, the pilot injection(s) and the main injection can be the only injections of the combustion cycle. Thus, within the combustion cycle, another injection that starts after the main injection, i.e., a post injection, may not be implemented in embodiments of the disclosed subject matter.

Figure 3A:
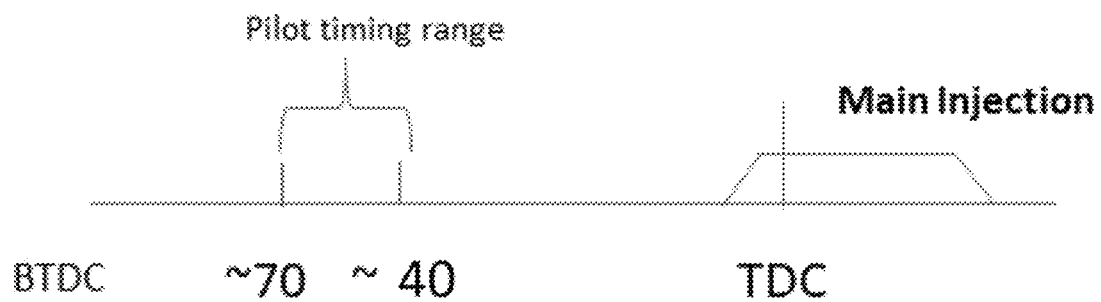
FIG. 3A shows an injection timing diagram according to one or more embodiments of the disclosed subject matter.

The predetermined range for the pilot injection(s) can be from 85 to 40 degrees BTDC. For instance, in the case of only one pilot injection, the pilot injection can occur from at or about 70 degrees BTDC to at or about 40 degrees BTDC. Occur, in this context, can mean start or be initiated. An example of such injection timing pattern is shown in FIG. 3A. In this example, the pilot injection, which can be the only pilot injection for the combustion cycle, can be continuous, for instance, for at or about 1 to 10 degrees. In this example, the main injection can start before TDC and end after TDC, though embodiments of the disclosed subject matter are not so limited. Optionally, more of the main injection may occur after TDC, such as shown in FIG. 3A. Also, notably, the amount of fuel injected for the main injection can be greater than the amount of fuel injected for the pilot injection.

Figure 3B:
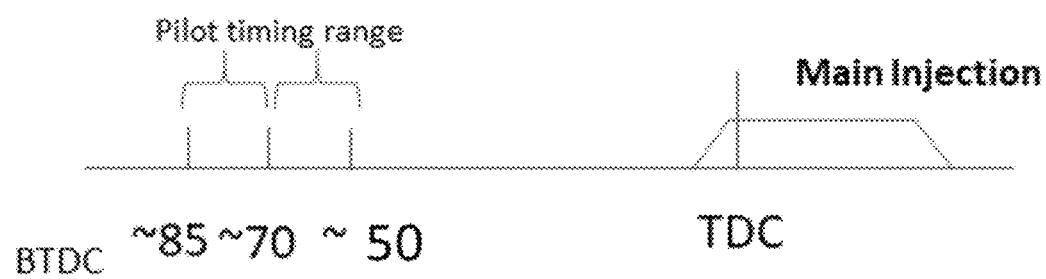
FIG. 3B shows another injection timing diagram according to one or more embodiments of the disclosed subject matter.

As another example, in the case of multiple pilot injections (e.g., only two pilot injections), the pilot injections can occur from at or about 85 degrees BTDC to at or about 50 degrees BTDC. An example of such injection timing pattern is shown in FIG. 3B. The multiple pilot injections may have distinct start and stop timings. Thus, the multiple pilot injections may be referred to or characterized as distinct injections. For instance, a first one of the pilot injections can occur at 85 degrees BTDC and a second one of the pilot injections can occur at 70 degrees BTDC. Occur, in this context, can mean start or be initiated. In this example, the first one of the pilot injections can be continuous, for instance, for at or about 1 to 10 degrees. Likewise, the second one of the pilot injections can be continuous, for instance, for at or about 1 to 10 degrees. Moreover, the durations for the pilot injections (e.g., the first pilot injection and the second pilot injection) can be the same or different. A predetermined amount of time may be provided between the end of one pilot injection (e.g., the first pilot injection) and the start of the next pilot injection (e.g., second pilot injection). For instance, adjacent pilot injections may be separated by at least 200 µs.

Similar to above, in this example, the main injection can start before TDC and end after TDC, though embodiments of the disclosed subject matter are not so limited. Optionally, more of the main injection may occur after TDC, such as shown in FIG. 3B. No additional injections may occur between the last of the pilot injections and the main injection. Also, notably, the amount of fuel injected for the main injection can be greater than the amount of fuel injected for all of the pilot injections combined.

Each pilot injection may be of a lesser duration than the main injection. For instance, each pilot injection may occur for 300 µs to 1000 µs (inclusive), whereas the main injection duration can be controlled by the governor. In this example, at 1,800 rpm 700 µs can correspond to about 7 degrees crank angle. In the case of multiple pilot injections, optionally, all pilot injections may occur for a same amount of time (e.g., again, 700 µs). The shape of the injection may take any suitable form, including a triangular-shaped waveform, a square-shaped waveform, or a plateau having gradual beginning and endings, such as shown in FIG. 3A and FIG. 3B. As noted above, each injection can be continuous from start to finish.

INDUSTRIAL APPLICABILITY

As noted above, embodiments of the present disclosure can implement one or more pilot injections at a specific timing in ducted fuel injection (DFI) systems and methodologies.

As discussed above, ducted assemblies may be implemented in combustion engines to enhance mixing and reduce the amount of soot formed within combustion chambers of such engines. In particular, the fuel jets can interact with the ducts to enhance mixing, thereby reducing the amount of soot formed.

Embodiments of the disclosed subject matter can expand the use of ducted fuel injection by using specific injection timing, which notably can include one or more pilot injections, to improve soot reduction. That is, embodiments of the disclosed subject matter can use pilot injection(s) in conjunction with ducted fuel injection to further reduce soot. For instance, injection timings according to embodiments of the disclosed subject matter can reduce engine out soot by as much as 50% to 70% compared to when pilot injections are not implemented, and in any case can reduce engine out soot compared to injection timings outside of the timing patterns described herein. Overall soot reduction is achieved by improved soot oxidation from OH radicals that is generated by pilot injection undergoing low temperature reaction inside the duct. The corresponding internal combustion engine may therefore be referred to or characterized as a low-soot output engine.

More generally, embodiments of the disclosed subject matter can implement a specific injection timing, which, as noted above, implements one or more pilot injections, in the context of a ducted fuel injection system, to improve emissions. As noted above, the one or more pilot injections can occur at a specific time during the combustion cycle, particularly at specific time(s) before top dead center (BTDC). Reduction in soot from the pilot injection(s) can be the result of improving low temperature reaction inside the duct that increases OH radicals. The increase in low temperature reactions can be due to relatively more rich air/fuel (A/F) mixture in the duct (due to less air entrainment) and relatively cooler air/fuel (A/F) mixture temperature in the duct. Overall engine out soot is reduced because improved low temperature reaction increases OH radicals which enhances soot oxidation.

Thus, embodiments of the disclosed subject matter can combine ducted fuel injection (DFI) with an early pilot injection (or injections) to reduce PM (or soot) (NOx can be reduced via EGR). Therefore, simultaneous reduction of NOx and PM can be achieved compared to a non-ducted injection system and/or a ducted injection system that does not implement specific methodologies according to embodiments of the disclosed subject matter (e.g., because post injection(s) can be avoided). With DFI in conjunction with pilot(s) and main injection, lower injection pressure can be used to achieve the same or lower soot compared to non-DFI implementations. For instance, rail pressure can be lowered at or about 50 MPa compared to non-DFI implementations, for instance, to achieve the same soot level.

As noted above, the injection timing pattern according to embodiments of the disclosed subject matter can include, per combustion cycle, at least one/one or more pilot injections and a main injection, wherein each injection may be passed through the duct(s) 174. Each pilot injection, as well as the main injection, can occur according to specific timings along the combustion cycle. In particular, all pilot injections can be controlled to occur in a predetermined range before top dead center (BTDC) for the combustion cycle, whereas the main injection can be controlled to occur relative to top dead center (TDC) of the combustion cycle. For instance, the main injection timing can range from at or about 20 degrees BTDC to at or about 10 degrees after top dead center (ATDC). Thus, the main injection can at least start before TDC (e.g., at or about at 20 degrees BTDC), can start after TDC (e.g., at or about at 10 degrees after TDC), or can span TDC. According to one or more embodiments, the main injection may occur at least at TDC.

The predetermined range for the pilot injection(s) can be from 85 to 40 degrees BTDC. For instance, in the case of only one pilot injection, the pilot injection can occur, i.e., start, from at or about 70 degrees BTDC to at or about 40 degrees BTDC. An example of such injection timing pattern is shown in FIG. 3A. In this example, the pilot injection, which can be the only pilot injection for the combustion cycle, can be continuous, for instance, for at or about 1 to 10 degrees. In this example, the main injection can start before TDC and end after TDC, though embodiments of the disclosed subject matter are not so limited. In this example, no additional injections may occur between the pilot injection and the main injection, and the amount of fuel injected for the main injection can be greater than the amount of fuel injected for the pilot injection.

As another example, in the case of multiple pilot injections (e.g., only two pilot injections, a first pilot injection and a second pilot injection), the pilot injection can occur, i.e., start, from at or about 85 degrees BTDC to at or about 50 degrees BTDC. The multiple pilot injections may have distinct start and stop timings. Thus, the multiple pilot injections may be referred to or characterized as distinct injections. For instance, a first one of the pilot injections can occur, i.e., start, at or about at 85 degrees BTDC and a second one of the pilot injections can occur, i.e., start, at or about 70 degrees BTDC. In this example, the first one of the pilot injections can be continuous, for instance, for at or about 1 to 10 degrees. Likewise, the second one of the pilot injections can be continuous, for instance, for at or about 1 to 10 degrees. The durations for the pilot injections (e.g., the first pilot injection and the second pilot injection can be the same or different. A predetermined amount of time may be provided between the end of one pilot injection (e.g., the first pilot injection) and the start of the next pilot injection (e.g., second pilot injection). For instance, adjacent pilot injections may be separated by at least 200 µs.

Similar to above, in this example, the main injection can start before TDC and end after TDC, though embodiments of the disclosed subject matter are not so limited. The amount of fuel injected for the main injection can be greater than the amount of fuel injected for all of the pilot injections combined.

Figure 4:
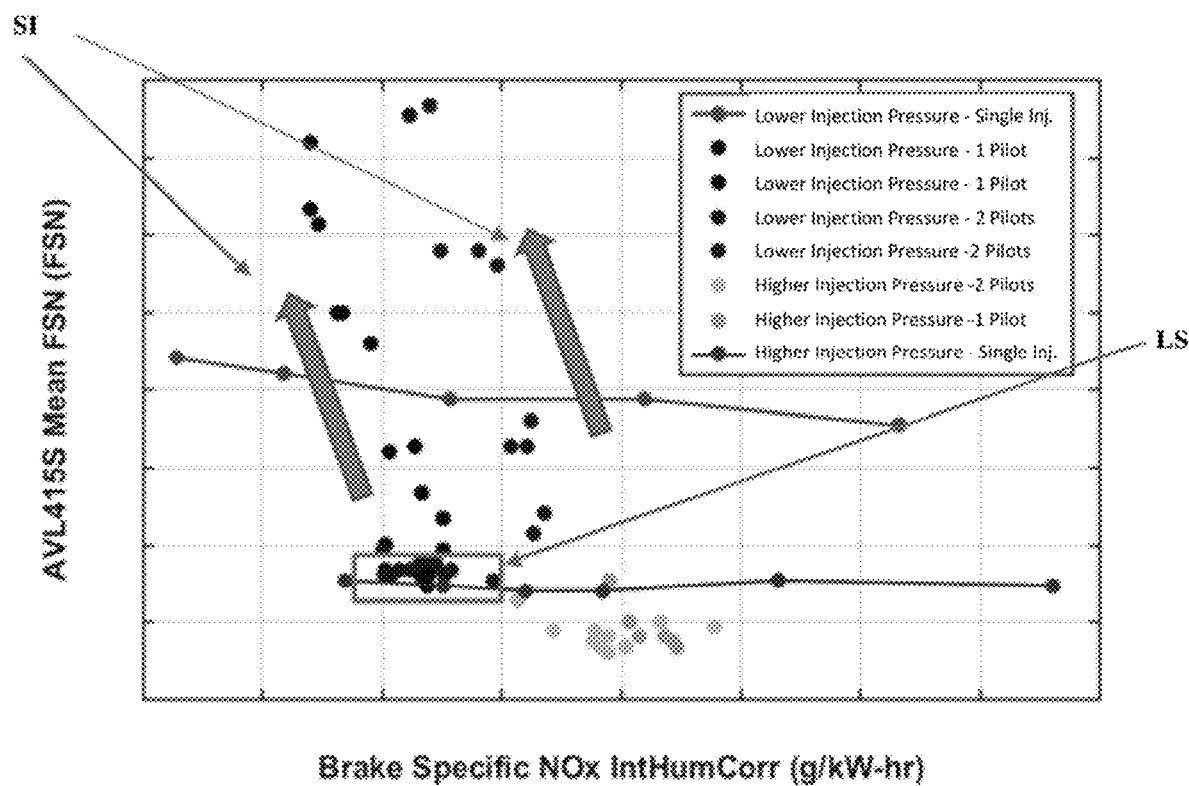
FIG. 4 shows a graph of filter smoke number (FSN) versus brake specific NOx according to one or more embodiments of the disclosed subject matter.
Figure 5:
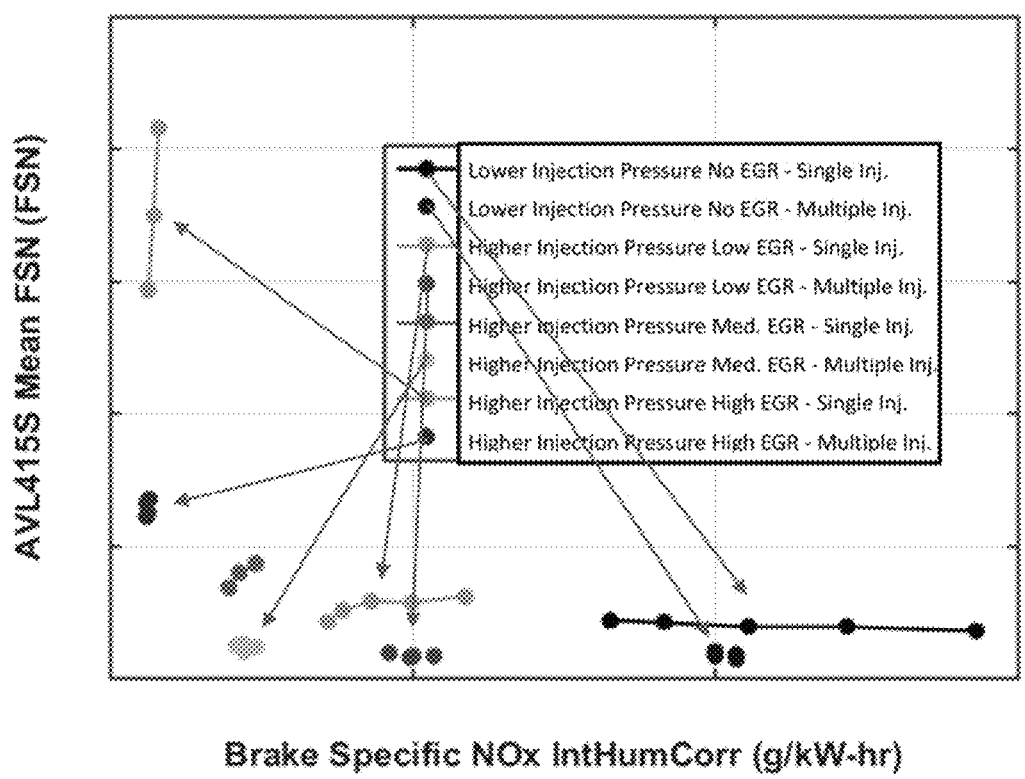
FIG. 5 shows another graph of filter smoke number (FSN) versus brake specific NOx according to one or more embodiments of the disclosed subject matter.

Turning to FIG. 4 and FIG. 5, FIG. 4 shows a graph of filter smoke number (FSN) versus brake specific NOx, whereas FIG. 5 shows another graph of filter smoke number (FSN) versus brake specific NOx. Moreover, these two graphs show single and double pilot injections, though embodiments of the disclosed subject matter are not limited to one or two pilot injections; rather, as noted above, the number of pilot injections can be from one to six (inclusive), for instance. Generally, as the number of pilot injections increases the amount of fuel output per pilot injection can decrease for all of the pilot injections. Multiple pilot injections, of relatively smaller amounts of fuel, may lead to less penetration compared to a single pilot injection having a relatively greater amount of fuel.

FIG. 4 and FIG. 5 also show two rail pressures, a medium rail pressure and a high rail pressure, which may be referred to as a lower injection pressure and a higher injection pressure (e.g., relative to each other). In FIG. 4, the two arrows SI show that soot can increase when advancing beyond optimal pilot timings according to embodiments of the disclosed subject matter. FIG. 4 also shows that in order to achieve the lowest soot, for a single pilot injection the pilot injection should not start earlier than at or about 70 degrees BTDC, whereas for the case of two pilot injections the first pilot injection should not start earlier than at or about 85 degrees BTDC and the second pilot injection should not be retarded beyond 50 degrees BTDC. The lowest soot LS (i.e., lowest AVL soot #) is shown in the box in FIG. 4, for a medium rail pressure, and the injection can be initiated from at or about 70 degrees to at or about 40 degrees BTDC for a single pilot injection and, for two pilot injections, from at or about 85 degrees to at or about 70 degrees BTDC for the first pilot injection and at or about 50 degrees to at or about 50 degrees BTDC for the second pilot injection (inclusive). Here, single injection can mean without pilot injections, i.e., only a main injection. Incidentally, the ability to operate at lower rail pressure according to embodiments of the disclosed subject matter can, among other benefits, generate less parasitics and/or provide less chance of cavitation (which can reduce erosion of the injector tip).

Regarding FIG. 5, this figure shows, generally speaking, the decoupling of soot, and the ability to run significant amount of EGR and have almost no effect on soot, according to embodiments of the disclosed subject matter. FIG. 5 moreover shows that with one or more pilot injections coupled with use of ducted fuel injection a relatively low soot level can be achieved under a wider range of NOx levels. In particular, FIG. 5 shows that with one or more pilot injections coupled with use of ducted fuel injection lower soot level can be achieved relative to a single ducted fuel injection case at a given EGR and injection pressure setting with relative soot reduction increasing as EGR increases. Here, hookup can represent lines through all of the respective point groupings. Thus, with pilot injection(s), soot reduction of at or about 50% to at or about 70% (inclusive) can be achieved as compared to single injection. As noted above, single injection can mean without pilot injections, i.e., only a main injection.

Figure 6:
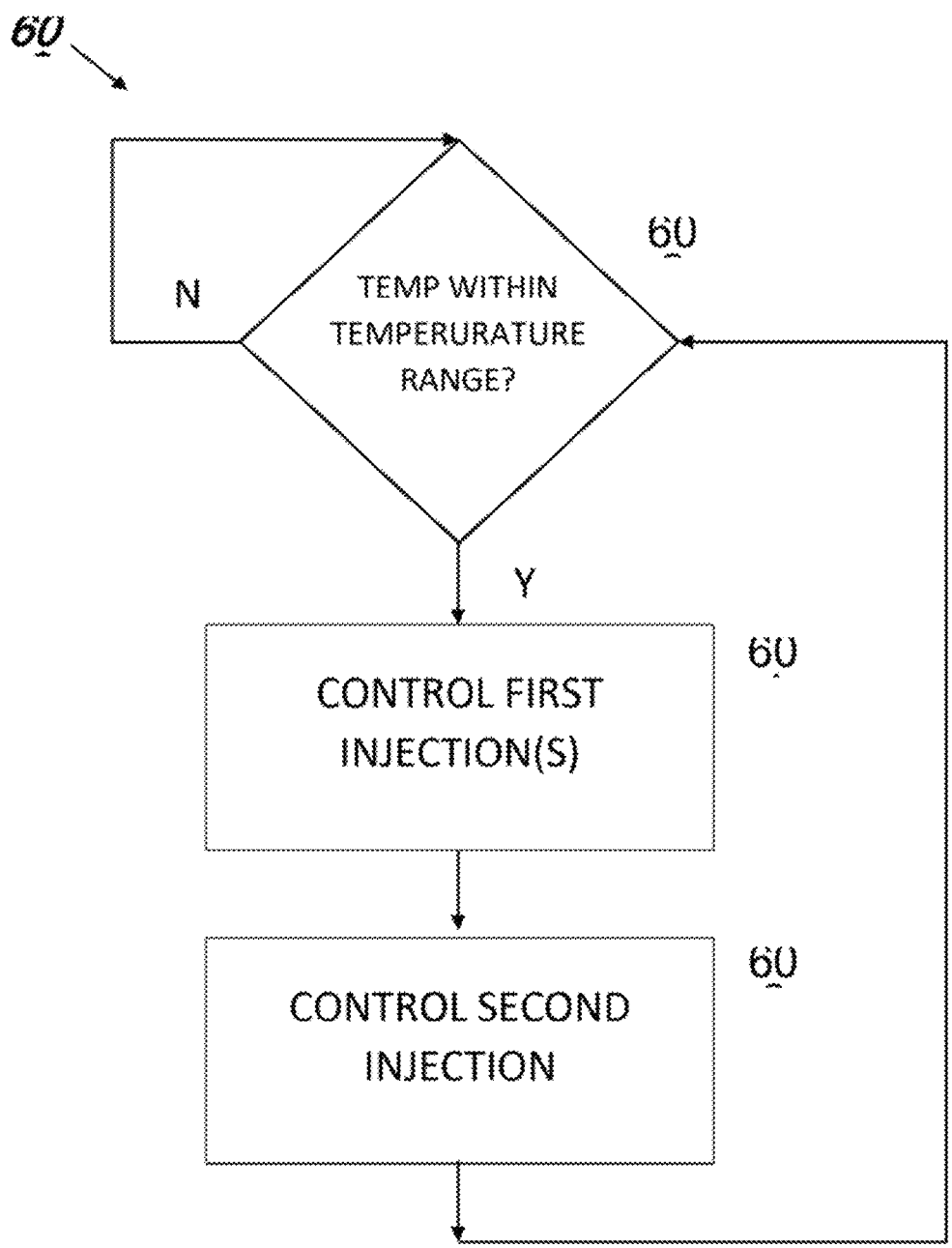
FIG. 6 is a method according to one or more embodiments of the disclosed subject matter.

FIG. 6 is a method 600 according to one or more embodiments of the disclosed subject matter. The method 600 can be implemented using a non-transitory computer-readable storage medium having stored thereon instructions that, when executed by one or more processors, for instance, of controller 200, can cause the one or more processors to perform some or all of the method 600.

The method 600 can comprise at 602, determining a condition of the engine 100 where in-cylinder temperature of the combustion chamber 116 is within a predetermined temperature range (which may include at or above a predetermined temperature threshold). The controller 200 may make this determination. Moreover, the controller may use feedback from the sensor 250, which may be an in-cylinder pressure sensor, to determine the in-cylinder temperature of the combustion chamber 116. It is noted that operation 602 can be an optional operation according to one or more embodiments of the disclosed subject matter. That is, the method 600 may or may not include operation 602.

The method 600 may proceed to implementing injection timings according to embodiments of the disclosed subject matter when the in-cylinder temperature of the combustion chamber 116 is within the predetermined temperature range. In this regard, the predetermined temperature range can be a non-zero and non-startup temperature value or value range. Thus, injection timings according to embodiments of the disclosed subject matter may not be performed at startup of the engine 100, or as part of a start-up routine for the engine 100. Rather, injection timing control according to embodiments of the disclosed subject matter may be performed only when the temperature of the engine 100, particularly in-cylinder temperature of the combustion chamber 116 thereof, is at a suitable temperature, i.e., within the predetermined temperature threshold.

When the temperature of the engine 100 has reached the predetermined temperature range, for instance, the predetermined temperature threshold, at 602 the method 600 may proceed to perform injection timing control according to embodiments of the disclosed subject matter. If the temperature of the engine 100 has not reached the predetermined temperature threshold, the method 600 may continue checking the temperature of the engine 100 against the predetermined temperature threshold.

At 604 the method 600 can control an injection timing according to embodiments of the disclosed subject matter. In particular, at least one/one or more pilot injections can be performed within a predetermined range before top dead center (BTDC) during a combustion cycle. The predetermined range for each of the pilot injection(s) to start can be from 85 to 40 degrees BTDC, as discussed above. In this regard, the specific timing for the pilot injection(s) may be based on how many pilot injections are to occur per combustion cycle. As an example, for higher in-cylinder temperature embodiments of the disclosed subject matter may be more likely to use a two pilot injection scheme and more advanced pilot timings. On the other hand, for lower in-cylinder temperature embodiments of the disclosed subject matter may be more likely to use a two pilot injection scheme and more retarded pilot timings. And as the load gets lower embodiments of the disclosed subject matter may tend to use a single pilot injection scheme with more retarded pilot injection timing.

At 606 the method 600 can continue controlling the injection timing according to embodiments of the disclosed subject matter. Here, a main injection can be performed after all of the pilot injection(s) have been performed and relative to top dead center (TDC). For instance, the main injection can start before TDC or can start after TDC. According to embodiments of the disclosed subject matter at least some of the main injection may occur at top dead center (TDC). For instance, the main injection can span top dead center (TDC). As noted above, a first amount of the fuel injected for the main injection can be greater than a second amount of fuel injected for a total of the one or more/at least one pilot injections.

The terms "data," "content," "information" and similar terms may be used interchangeably, according to some example embodiments of the present invention, to refer to data capable of being transmitted, received, operated on, and/or stored. Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A method for injecting fuel into a combustion chamber of an internal combustion engine, comprising:
   determining, using control circuitry, whether in-cylinder temperature of the combustion chamber is within a predetermined temperature range, the predetermined temperature range being a non-zero and non-startup temperature values;
   outputting, under control of the control circuitry, to the combustion chamber of the internal combustion engine via a fuel injection system and at least one duct inside the combustion chamber of the internal combustion engine, a plurality of pilot injections of fuel in a predetermined range before top dead center (BTDC) for a combustion cycle of the internal combustion engine; and
   outputting, under control of the control circuitry, to the combustion chamber via the fuel injection system and the at least one duct, a main injection of fuel for the combustion cycle of the internal combustion engine after said outputting the plurality of pilot injections,
   wherein the main injection of fuel passes through the at least one duct and the plurality of pilot injections of fuel pass through the at least one duct,
   wherein an amount of fuel of the plurality of pilot injections is less than an amount of fuel of the main injection,
   wherein the plurality of pilot injections of fuel per combustion cycle is from two to six pilot injections,
   wherein the predetermined range before top dead center (BTDC) of the plurality of pilot injections of fuel is from 85 to 50 degrees BTDC,
   wherein said outputting the main injection is such that the main injection begins before top dead center (TDC) and ends after top dead center (TDC), and
   wherein said outputting the plurality of pilot injections of fuel is performed only in a case where the in-cylinder temperature of the combustion chamber is determined to be within the predetermined temperature range.

2. The method according to claim 1,
   wherein each said pilot injection of the plurality of pilot injections of fuel is for 300 µs to 1000 µs,
   wherein duration of said main injection is controlled by a governor,
   wherein each said at least one duct is coupled to an upper surface of the combustion chamber, and
   wherein each said at least one duct is spaced from the fuel injector by a standoff distance.

3. A non-transitory computer-readable storage medium having stored thereon instructions that, when executed by one or more processors, causes the one or more processors to perform a method for injecting fuel comprising:
   controlling a fuel injector to inject one or more distinct pilot injections, into a combustion chamber of an internal combustion engine through at least one duct inside the combustion chamber of the internal combustion engine, in a predetermined range before top dead center (BTDC) for a combustion cycle; and
   controlling the fuel injector to inject a main injection into the combustion chamber through the at least one duct for the combustion cycle,
   wherein a first amount of the fuel injected for the main injection is greater than a second amount of fuel injected for said controlling the fuel injector to inject the one or more distinct pilot injections,
   wherein the predetermined range before top dead center (BTDC) of the one or more distinct pilot injections is from 85 to 40 degrees BTDC,
   wherein said controlling the fuel injector to inject the main injection is such that the main injection begins before top dead center (TDC) and ends after top dead center (TDC),
   wherein said outputting the main injection is such that the main injection begins before top dead center (TDC) and ends after top dead center (TDC), and
   wherein said controlling the fuel injector to inject the one or more distinct pilot injections is performed in association with a temperature of the combustion chamber being at or achieving 500 K to 750 K.

4. The non-transitory computer-readable storage medium according to claim 3,
   wherein at least one of said one or more distinct pilot injections is for 300 µs to 1000 µs, and
   wherein the at least one duct includes a plurality of ducts each spaced from the fuel injector by a standoff distance.

5. The non-transitory computer-readable storage medium according to claim 3, wherein the one or more distinct pilot injections per combustion cycle includes only one pilot injection for the combustion chamber, and wherein the predetermined ramie before top dead center (BTDC) of the one or more distinct pilot injections starts and ends from 70 to 40 degrees BTDC.

6. The non-transitory computer-readable storage medium according to claim 3, wherein the one or more distinct pilot injections per combustion cycle includes a plurality of the distinct pilot injections for the combustion chamber per combustion cycle, and wherein the predetermined range before top dead center (BTDC) of the plurality of distinct pilot injections starts and ends from 85 to 50 degrees BTDC.

7. The non-transitory computer-readable storage medium according to claim 3, wherein said controlling the fuel injector to inject the one or more distinct first injections and said controlling the fuel injector to inject the second injection is performed according to a predetermined rail pressure for the fuel.

* * * * *